United States Patent [19]
Yamamoto et al.

[11] Patent Number: 5,606,227
[45] Date of Patent: Feb. 25, 1997

[54] SURGE GENERATOR HAVING A LOW VOLTAGE TRANSFORMER WINDING CONNECTED TO A HIGH VOLTAGE WINDING

[75] Inventors: Noboru Yamamoto, Kariya; Masamichi Ishikawa, Hekinan; Kenji Yoneima, Oobu, all of Japan

[73] Assignee: Nippondenso Co., Ltd., Kariya, Japan

[21] Appl. No.: 538,044

[22] Filed: Oct. 2, 1995

[30] Foreign Application Priority Data

Oct. 12, 1994 [JP] Japan .................................. 6-246560

[51] Int. Cl.$^6$ .................................................. H05B 37/02
[52] U.S. Cl. ............................................ 315/289; 315/278
[58] Field of Search ................................ 315/289, 290, 315/276, 278

[56] References Cited

U.S. PATENT DOCUMENTS

| | | | |
|---|---|---|---|
| 4,410,837 | 10/1983 | Suzuki et al. | 315/289 |
| 4,939,430 | 7/1990 | Droho | 315/219 |
| 5,241,242 | 8/1993 | Daub | 315/289 |
| 5,426,346 | 6/1995 | Allison | 315/289 |

FOREIGN PATENT DOCUMENTS 4-62796  2/1992  Japan .

*Primary Examiner*—Robert Pascal
*Assistant Examiner*—Michael B. Shingleton
*Attorney, Agent, or Firm*—Cushman, Darby & Cushman IP Group of Pillsbury Madison & Sutro LLP

[57] ABSTRACT

A semiconductor switching element is connected to the first winding of a transformer. A smoothing capacitor is connected to the second winding of the transformer through a rectifier diode. The charging voltage Va of this smoothing capacitor serves as the applied voltage of a discharge lamp. When the discharge lamp is lighting, the second winding serves as a power source for supplying power to the discharge lamp. A capacitor is connected to the third winding of the transformer through a rectifier diode. The charging voltage of this capacitor serves as the applied voltage of a discharge tube. When the discharge tube discharges, a high-voltage starting pulse is provided to the secondary winding of a high-voltage coil, thereby rendering the discharge lamp ready for lighting. Therefore, when the discharge lamp is starting, the third winding serves as a power source for supplying starting power to the discharge lamp.

14 Claims, 4 Drawing Sheets

SURGE GENERATOR HAVING A LOW VOLTAGE TRANSFORMER WINDING CONNECTED TO A HIGH VOLTAGE WINDING

CROSS-REFERENCE TO RELATED APPLICATION

This application is related to and claims priority from Japanese Patent Application No. Hei. 6-246560, incorporated herein by reference.

BACKGROUND OF THE INVENTION

1. Field of the Invention

The present invention generally relates to a lighting system for a high-voltage discharge lamp, and more particularly to a lighting system for a high-voltage discharge lamp for use in lighting and the like.

2. Description of Related Art

A DC—DC converter and other components provided independently from a power supply supplying power to a high-voltage discharge lamp for lighting has been disclosed as a way of generating high-voltage starting pulses for lighting the high-voltage discharge lamp in, for example, Japanese Patent Publication Laid-Open No. Hei. 4-62796. In such systems, however, the conventional lighting system for a high-voltage discharge lamp requires a large number of parts, a large size and a high cost and thereby poses a problem.

SUMMARY OF THE INVENTION

In view of the above problem, an object of the present invention is to provide a lighting system for a high-voltage discharge lamp which can reduce the number of parts, size and cost thereof by supplying power for generating high-voltage starting pulses and supplying power for lighting with a single transformer.

According to a first aspect of the invention, this object is achieved by providing a lighting system for a high-voltage discharge lamp which includes a transformer, a semiconductor switching element intermittently supplying primary current to a first winding which is the primary winding of the transformer, and a high-voltage coil for applying high-voltage starting pulses to the discharge lamp, where the transformer includes the first winding, a second winding which is a secondary winding for supplying power to the discharge lamp for lighting, and a third winding which is a secondary winding for supplying power to the high-voltage coil.

In this way, the transformer performs the functions of supplying power to the discharge lamp through the second winding when the discharge lamp is in lighting and of supplying power to the high-voltage coil through the third winding when the discharge lamp is starting. Thus, the number of parts, size and cost thereof can be reduced.

Preferably, an end of the third winding is connected to the connection point of the first winding and the semiconductor switching element, to the connection point of the second winding and the cathode side of the rectifier diode connected to the second winding.

When an end of the third winding is connected to the connection point of the first winding and semiconductor switching element, the voltage of the other end of the third winding can be made the sum of the voltage generated at the first winding when the semiconductor switching element is in the OFF state and the voltage generated at the third winding. This means that even if the number of turns of the third winding is reduced, sufficient power can be supplied to the high-voltage coil. Therefore, with the reduction in the number of turns of the third winding, the inter-layer capacity of the transformer can be reduced and the efficiency of the transformer can be improved.

When an end of the third winding is connected to the connection point of the second winding and rectifier diode connected to the second winding, the voltage at the other end of the third winding can be made the sum of the voltage generated at the second winding and the voltage generated at the third winding. Again, the number of turns of the third winding can be reduced and the efficiency of the transformer can be improved.

When an end of the third winding is connected to the cathode side of the rectifier diode connected to the second winding, the voltage of the other end of the third winding can be made the sum of the voltage of the cathode voltage of the rectifier diode and the voltage generated at the third winding. Once more, the number of turns of the third winding can be reduced, and the efficiency of the transformer can be improved.

According to another aspect of the present invention, the above object is achieved by providing a lighting system for a high-voltage discharge lamp which includes a transformer, a semiconductor switching element for intermittently supplying primary current to a first winding which is the primary winding of the transformer, and a high-voltage coil for applying high-voltage starting pulses to the discharge lamp, where the transformer includes the first winding, a second winding which is a secondary winding for supplying power to the discharge lamp for lighting, and a third winding which is a secondary winding for supplying power to the high-voltage coil, and where a serial circuit with a diode and a capacitor is connected in parallel with the first winding, a resistance is connected in parallel with the capacitor, and an end of the third winding is connected to the connection point between capacitor and diode.

As noted above in connection with the first aspect of the invention, according to this aspect the transformer performs the functions of supplying power to the discharge lamp through the second winding when the discharge lamp is lighting and of supplying power to the high-voltage coil through the third winding when the discharge lamp is starting. Therefore, the number of parts, size and cost thereof can be reduced.

Furthermore, the serial circuit with the diode and the capacitor is connected in parallel with the first winding, the resistance is connected in parallel with the capacitor, and an end of the third winding is connected to the connection point between the capacitor and diode. Accordingly, the voltage at the other end of the third winding can be made the sum of the voltage generated at the first winding by the induction voltage of the second winding when the semiconductor switching element is in the OFF state and the voltage generated at the third winding. As above, the number of turns of the third winding can be reduced, the inter-layer capacity of the transformer can be reduced, and the efficiency of the transformer can be improved.

In the above aspects, it is possible that a capacitor charged through a rectifier diode is connected to the third winding and that the system includes a charging control circuit for controlling the charge to the capacitor. Further, it is possible that the charging control circuit controls the charging voltage of the capacitor to a high value when the applied voltage of the discharge lamp is equal to or higher than a specified value, and controls the charging voltage of the capacitor to a low value when the applied voltage of the discharge lamp is lower than the specified value.

In this way, a capacitor charged through the rectifier diode connected to the third winding and a charging control circuit for controlling the charging to the capacitor are provided. Therefore, the charging voltage of the capacitor can be set to two different levels for starting and lighting of the discharge lamp respectively, and the undesirable generation of high-voltage starting pulses due to the high-voltage coil when the discharge lamp is lighting can be prevented.

Preferably, the charging control circuit sets the charging voltage of the capacitor to a high value when the applied voltage of the discharge lamp is equal to or, higher than a specified value and sets the charging voltage of the capacitor to a low value when the applied voltage of the discharge lamp is lower than the specified value. Here, generally, the applied voltage of the discharge lamp is a high value when the discharge lamp is starting before lighting and is a low value when the discharge lamp is lighting. For this reason, by setting the specified value based on the applied voltage of the discharge lamp during starting and lighting, the charging voltage of the capacitor when the discharge lamp is in lighting can be controlled to a low value, and the generation of high-voltage starting pulses due to the high-voltage coil when the discharge lamp is lighting can be prevented.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
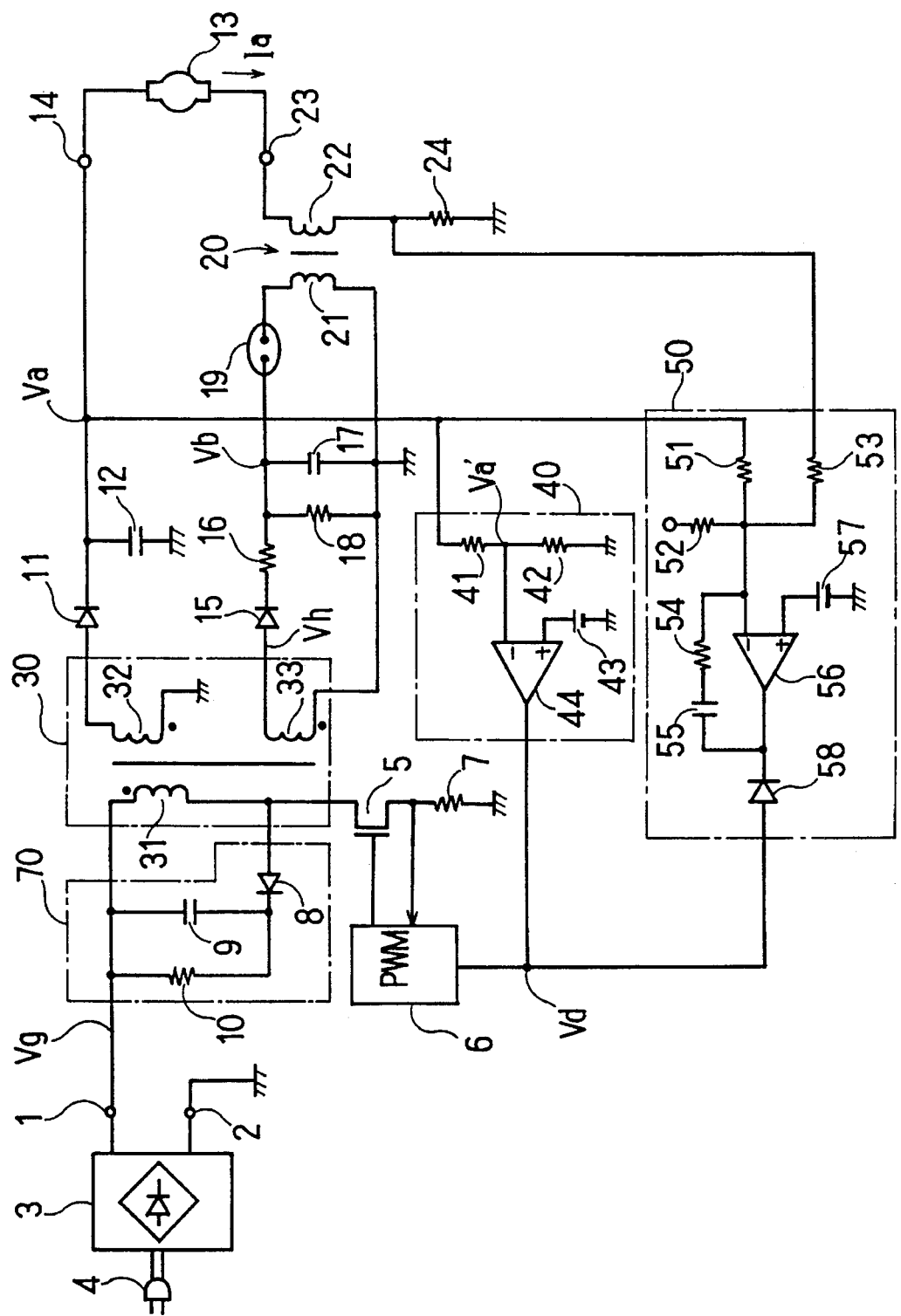
FIG. 1 is a view illustrating the construction of a lighting system for a high-voltage discharge lamp according to a first embodiment of the present invention.

FIG. 1 is a view illustrating the construction of a lighting system for a high-voltage discharge lamp according to a first embodiment of the present invention.

In FIG. 1, reference numeral 1 denotes a positive power supply output terminal and reference numeral 2 denotes a negative power output terminal. A diode bridge circuit 3 is connected to the power input terminals 1 and 2, and a commercial AC power source 4 is connected to the diode bridge circuit 3. Therefore, DC power obtained by the full-wave rectification of the commercial AC power is supplied to the power supply input terminals 1 and 2.

An end of the first winding 31, which is the primary winding of a transformer 30, is connected to the positive power supply input terminal 1 and a semiconductor switching element 5 such as an FET is connected to the other end of the first winding 31. A PWM control circuit 6 is connected to the control terminal of the semiconductor switching element 5 such as the gate terminal of the semiconductor switching element 5. The PWM control circuit 6 controls the switching frequency of the semiconductor switching element 5, as well as the duty ratio (i.e., the ratio of the ON period to the OFF period in a switching cycle) and the like. A current detection resistance 7 for detecting current flowing into the semiconductor switching element 5 is connected to the semiconductor switching element 5. This current detection resistance 7 operates the PWM control circuit 6 so that the semiconductor switching element 5 is maintained in the OFF state for a period from the moment when the current flowing into the semiconductor switching element 5 exceeds a specified value to the moment when the next switching cycle starts to protect the semiconductor 5 switching element from overcurrent or surge current.

The anode of a diode 8 is connected to the connecting point between the first winding 31 of the transformer 30 and the semiconductor switching element 5. On the other hand, a capacitor 9 is connected between the cathode of the diode 8 and an end of the first winding 31, and a discharge resistance 10 is connected in parallel to the capacitor 9. The diode 8, capacitor 9 and discharge resistance 10 form a snubber circuit 70. The snubber circuit 70 is designed so that when the semiconductor switching element 5 switches to the OFF position, it stores the magnetic energy generated by the leakage inductance of the first winding 31 in the capacitor 9 as an electric energy through the diode 8 to protect the semiconductor-Switching element 5. Here, the electric energy accumulated in the capacitor 9 is discharged through the discharge resistance 10.

The second winding 32, which is the secondary winding of the transformer, is grounded at an end and connected to the anode of a rectifier diode 11. The positive terminal of a smoothing capacitor 12 is connected to the cathode of the rectifier diode 11, and the negative terminal of the smoothing capacitor 12 is grounded. A terminal 14 of a discharge lamp 13 is connected to the positive terminal of the smoothing capacitor 12.

The third winding 33, which is the other secondary winding of the transfer 30, is grounded at an end and connected to a rectifier diode 15 at the other end. The positive terminal of a high-voltage pulse generating capacitor 17 is connected to the cathode of the rectifier diode 15 through a current limiting resistance 16, and the negative terminal of this capacitor 17 is grounded. A discharge resistance 18 having a high resistance value (e.g., on the order of several MΩ) is connected to the capacitor 17 for discharging the charge on the capacitor 17. A discharge tube 19 for discharging when the charging voltage Vb of the capacitor 17 reaches or exceeds a specified value of the discharging voltage Ve (e.g., on the order of 1 kV) and the primary winding 21 of a high-voltage coil 20 are connected in series to both terminals of the capacitor 17. An end of the secondary winding 22 of the high-voltage coil 20 is connected to the other connection terminal 23 of the discharge lamp 13. The high-voltage coil 20 is designed so that when the charging voltage Vb of the capacitor 17 reaches the discharge voltage Ve when the discharge lamp 13 is starting before lighting and thereby the discharge tube 19 momentarily discharges, the pulsing discharge current flows to provide high-voltage pulses (e.g., on the order of tens of kilovolts) to the secondary winding 22 and light up the discharge lamp 13. An end of a current detection resistance 24 is connect-ed to the other end of the secondary winding 22 of the high-voltage coil 20 for detecting the current flowing into the discharge lamp 13, and the other side of this current detection resistance 24 is grounded.

A no-load voltage control circuit 40 is connected between the positive terminal side of the smoothing capacitor 12 and the input side of the PWM control circuit 6. This no-load voltage control circuit 40 is composed of voltage divider resistances 41 and 42 for dividing the charging voltage Va of the smoothing capacitor 12 (i.e., the voltage applied to the discharge lamp 13) and a comparator 44 for comparing the divided voltage Va' divided by these divider resistances 41 and 42 with a reference voltage 43. The reference voltage 43 is set based on the voltage level to be applied to the discharge lamp 13 (e.g., on the order of 300 V) when the discharge lamp 13 is started before lighting. The comparator 44 is designed to maintain the output Vd at a low level during the period when the divided voltage Va' is equal to or higher than the reference voltage 43 and to maintain the output level Vd at a high level during the period when the divided voltage Va' is lower than the reference voltage 43. The PWM control circuit 6 is constructed so that the operation can be stopped and the semiconductor switching element 5 maintained in the OFF state during the period when the output Vd of the comparator 44 is at the low level, and it holds the semiconductor switching element 5 in the switching operation at the maximum duty ratio during the period when the output Vd of the comparator 44 is at the high level.

A power control circuit 50 is connected between the positive terminal of the smoothing capacitor 12, the connection point of the secondary winding 22 of the high-voltage coil 20 and current detection resistance 24, and the PWM control circuit 6. This power control circuit 50 is composed of resistances 51–53 for determining the control target value of power to be supplied to the discharge lamp 13, operational amplifier 56 in which an inverting input terminal is connected to the connection points of these resistances 51 through 53 and in which a reference voltage 57 is applied to the non-inverting terminal, a series circuit with a capacitor 55 and a resistance 54 connected between the output terminal of this operational amplifier 56 and the inverting input, and a diode 58 in which the cathode is connected to the output terminal of the operational amplifier 56. The power control circuit 50 is designed so that when the discharge lamp 13 is lighting, it controls the PWM control circuit 6 based on the applied voltage Va and discharging current Ia of the discharge lamp 13 and controls the power supplied to the discharge lamp 13. It should be noted here that since the discharging current Ia does not flow to the discharge lamp 13 when the discharge lamp 13 is starting before lighting, the output of the operational amplifier 56 is at a high level and the diode 58 behaves as if it were maintained in the OFF state, and for this reason, the PWM control circuit 6 is controlled only by the output of the no-load voltage control circuit 40.

Now, the operation of the lighting system for a high-voltage discharge lamp constructed as described above will be described with reference to FIG. 2.

At the moment when a power supply switch (not illustrated) is turned ON, the divided voltage Va' of the charging voltage Va of the smoothing capacitor 12 is lower than the reference voltage 43. Accordingly, the output Vd of the comparator 44 is at a high level, and the PWM control circuit 6 switches the semiconductor switching element 5 at the maximum duty ratio and a specified switching frequency (e.g., on the order of tens of kilohertz). This permits intermittent flow of current to the first winding 31 of the transformer 30. The first winding 31 accumulates magnetic energy during the period when the semiconductor switching element 5 is in the ON state, and discharges this accumulated magnetic energy to the second winding 32 and the third winding 33 during the period when the semiconductor switching element 5 is in the OFF state. The magnetic energy discharged to the second winding 32 charges the smoothing capacitor 12 through the rectifier diode 11, while the magnetic energy discharged to the third winding 33 charges the capacitor 17 through the other rectifier diode 15 and the current limit resistance 16.

Figure 2A:
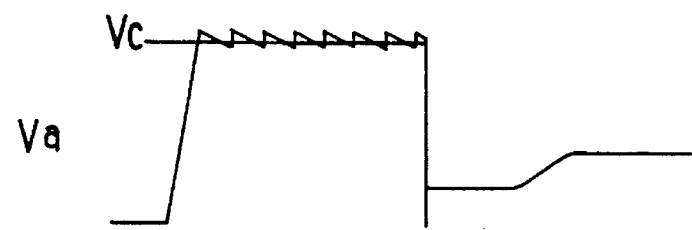
FIGS. 2A and 2B are graphs showing the operation of FIG. 1.
Figure 2B:
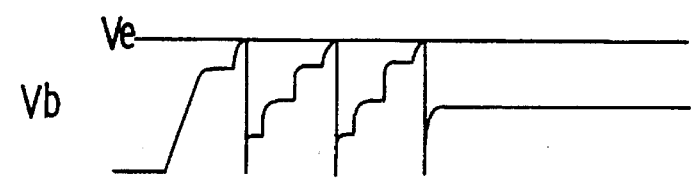

When the divided voltage Va' of the charging voltage Va of the smoothing capacitor 12 reaches the reference voltage 43, the output Vd of the comparator 44 drops to a low level, and the PWM control circuit 6 stops the switching operation of the semiconductor switching element 5 and maintains the semiconductor switching element 5 in the OFF state. Consequently, since current does not flow through the first winding 31 and magnetic energy is not accumulated in the first winding, charging of the smoothing capacitor 12 stops and the charge load of the smoothing capacitor 12 is discharged through the resistance in turn. Thereby, the charging voltage Va of the smoothing capacitor 12 is lowered. When the divided voltage Va' of the charging voltage Va of the smoothing capacitor 12 falls to the reference voltage 43, the output Vd of the comparator 44 returns to the high level again, and the PWM control circuit 6 switches the semiconductor switching element 5 at the maximum duty ratio. Accordingly, the first winding 31 has an accumulation of magnetic energy again, and the smoothing capacitor 12 is charged. Hereinafter, as described later, the same round of operations as described above is repeated until the discharge lamp 13 lights up. As illustrated in FIG. 2, the charging voltage Va of the smoothing capacitor 12 (i.e., the applied voltage of the discharge lamp 13) is controlled to a specified voltage level Vc (e.g., on the order of 300 V).

On the other hand, as described above, when the divided voltage Va' of the charging voltage Va of the smoothing capacitor 12 reaches the reference voltage 43 in the first place and therefore the accumulation of magnetic energy in the first winding 31 comes to a halt, charging to the capacitor 17 on the side of the third winding 33 also comes to a halt, and in turn the charging charge of the capacitor 17 is ready to be discharged through the resistance 18. However, since this resistance 18 has a high resistance value, unlike the charging voltage Va of the above-described smoothing capacitor 12, the charging voltage Vb of the capacitor 17 changes little. Subsequently, when magnetic energy is again accumulated in the first winding 31 as described above, the magnetic energy of the first winding 31 is discharged to the third winding 33, and the charging voltage Vb of the capacitor 17 further rises. Hereinafter, a round of the same operations as described above is repeated, and as illustrated in FIG. 2, the charging voltage Vb of the capacitor 17 rises in a step-like fashion. When the charging voltage Vb of the capacitor 17 reaches the discharging voltage Ve of the discharge tube 19 (e.g., on the order of 1 kV), the charging charge of the capacitor 17 momentarily flows to the primary winding 21 of the high-voltage coil 20 through the discharge tube 19, and high-voltage pulses (e.g., on the order of tens of kilovolts) are provided to the secondary winding 22. The high-voltage pulses are applied to the other connection terminal 23 of the discharge lamp 13, and the discharge lamp 13 is ready for lighting. If the discharge lamp 13 does not light up even with the first high-voltage pulse, the charging voltage Vb of the capacitor 17 rises again in a step-like fashion. When the charging voltage Vb of the capacitor 17 reaches the discharging voltage Ve of the discharge tube 19, the second high-voltage pulse is applied to the discharge lamp 13. If the discharge lamp 13 does not light up even with the second high-voltage pulse but lights up with a subsequent n-th high-voltage pulse after the discharge lamp 13 shifts from glow discharge to arc discharge, as illustrated in FIG. 2A, the charging voltage Va of the smoothing capacitor 12 (e.g., the voltage applied to the discharge lamp 13) momentarily falls due to the discharging current of the discharge lamp 13. Then, owing to the characteristics of the discharge lamp 13 itself, the discharge lamp 13 settles in a stable state.

As described above, when the discharge lamp 13 lights up, as illustrated in FIG. 2, the applied voltage Va of the discharge lamp 13 is approximately ⅕ (e.g., on the order of 60 V) as high as the applied voltage with no load (e.g., on the order of 300 V). For this reason, the voltage generated in the third winding 33 is also approximately ⅕ as high as the applied voltage with no load, and the charging voltage Vb of the capacitor 17 does not rise to the discharge voltage Ve until the discharge tube 19 is discharged. Furthermore, since the discharge resistance 18 has a high resistance value (e.g., on the order of several MΩ), there is little power loss.

After the discharge lamp 13 lights up, the power control circuit 50 detects the applied voltage Va and discharging current Ia of the discharge lamp 13 and controls the PWM control circuit 6 so that specified power can be supplied to the discharge lamp 13.

As described above, the lighting system according to the first embodiment has a single transformer 30 that can generate high-voltage pulses when the discharge lamp 13 is starting and power is supplied thereto. Therefore, the number of parts, size and cost can be reduced.

Figure 3:
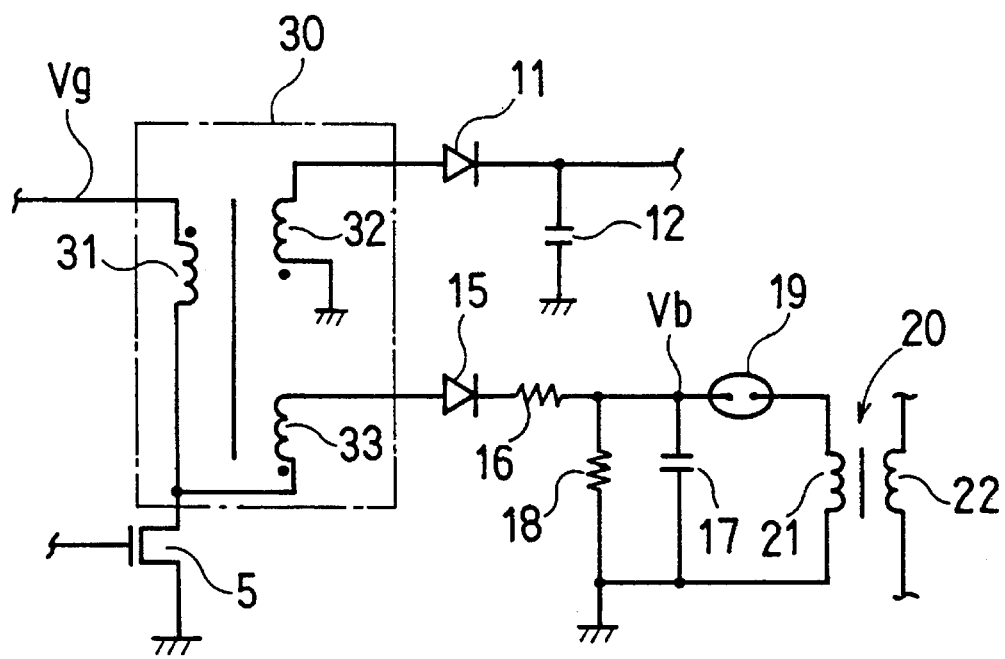
FIG. 3 shows a portion of a system according to a second embodiment of the present invention.

FIG. 3 shows part of a lighting system for a high-voltage discharge lamp according to a second preferred embodiment of the present invention.

In FIG. 3, an end of the third winding 33 of the transformer 30 is connected to the connection point of the first winding 31 and semiconductor switching element 5 in contrast to the first embodiment in which an end of the third winding 33 is grounded. The other parts of the construction are the same as those of the first embodiment as described above.

According to the second embodiment, when the discharge lamp 13 is starting, the charging voltage Vb of the capacitor 17 is the sum of the voltage generated at the first winding 31 by the induced voltage of the second winding 32 when the semiconductor switching element 5 is in the OFF state (strictly speaking, it is the voltage which is the sum of this generated voltage and the voltage Vg of the positive side power supply input terminal 1) and the voltage generated by the third winding 33. For this reason, even if the third winding 33 which has fewer turns than the third winding 33 of the first embodiment is used, a charging voltage Vb almost equal to the charging voltage Vb of the capacitor 17 of the first embodiment can be obtained. Accordingly, in the second embodiment, for the reduction in the number of turns of the third winding 33 as described above, the inductance between the first winding 31 and the third winding 33 and the inductance between the second winding 32 and the third winding 33 is reduced, and the efficiency of the transformer 30 can be improved.

Figure 4:
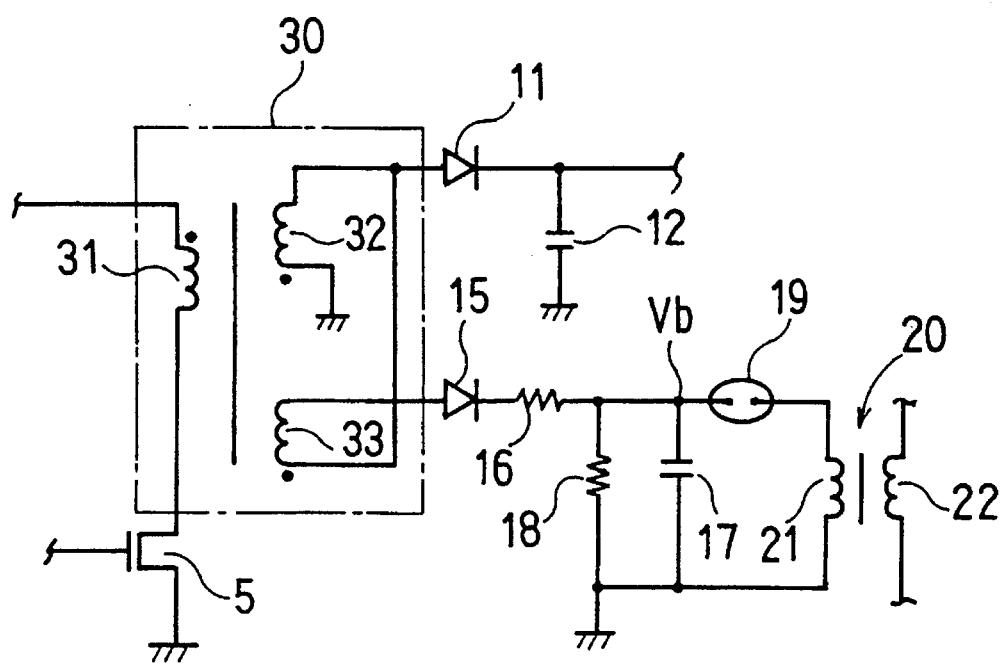
FIG. 4 shows a portion of a system according to a third embodiment of the present invention.

FIG. 4 shows part of a lighting system for a high-voltage discharge lamp according to a third preferred embodiment of the present invention.

In FIG. 4, an end of the third winding 33 of the transformer 30 is connected to the connection point of the second winding 32 and rectifier diode 11. The other parts of this embodiment are the same as those of the first embodiment described above.

According to the third embodiment, when the discharge lamp 13 is starting, the charging voltage Vb of the capacitor 17 is the sum of the voltage generated by the second winding 32 and the voltage generated by the third winding 33. For this reason, in the same way as the second embodiment, the third embodiment can set the number of turns of the third winding 33 to be smaller than the number of turns of the third winding 33 of the first embodiment. As a result, the efficiency of the transformer 30 can be improved.

Figure 5:
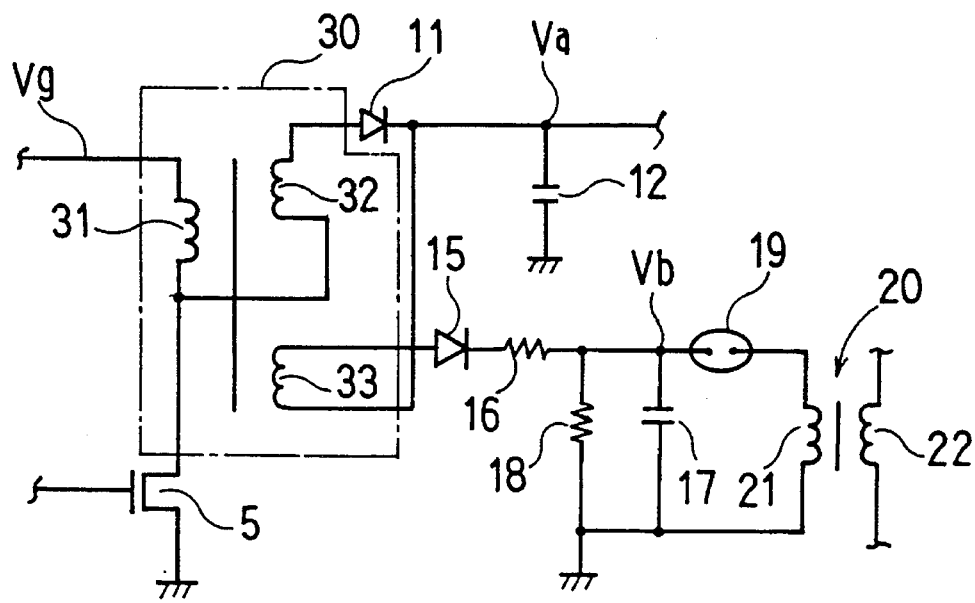
FIG. 5 shows a portion of a system according to a fourth embodiment of the present invention.

FIG. 5 shows part of a lighting system for a high-voltage discharge lamp according to a fourth preferred embodiment of the present invention.

In FIG. 5, an end of the third winding 33 is connected to the cathode side of the rectifier diode 11 connected to the second winding 32. For this reason, when the discharge lamp 13 is starting, the charging voltage Vb of the capacitor 17 is the sum of the charging voltage Va of the smoothing capacitor 12 and the voltage generated by the third winding 33. Accordingly, in the same way as the second and third embodiments, the fourth embodiment can set the number of turns of the third winding 33 to be smaller than that of the third winding 33 of the first embodiment. As a result, the efficiency of the transformer 30 can be improved. Here, in FIG. 5, an end of the second winding 32 is connected to the connection point of the first winding 31 and semiconductor switching element 5. This is because when a battery loaded by a vehicle (e.g., a 12 V battery) is connected to the power supply input terminals 1 and 2 instead of the commercial AC power source 4 and diode bridge circuit 3 of the first embodiment, there is no possibility that the smoothing capacitor 12 is not undesirably charged even if the first winding 31 and the second winding 32 are connected.

Figure 6:
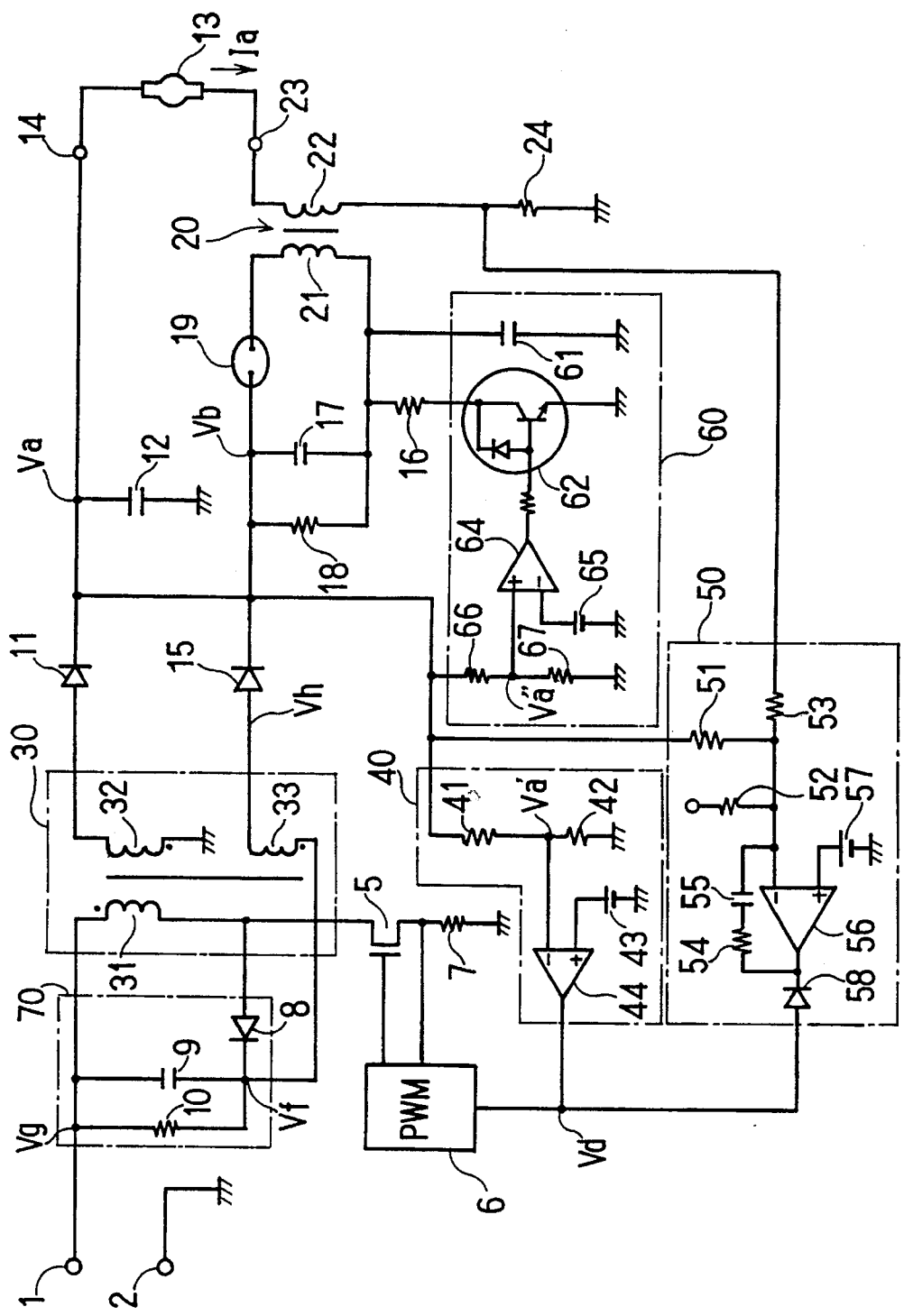
FIG. 6 shows a lighting system for a high-voltage discharge lamp according to a fifth embodiment of the present invention.

FIG. 6 shows a lighting system for a high-voltage discharge lamp according to a fifth preferred embodiment of the present invention.

In FIG. 6, an end of the third winding 33 of the transformer 30 is connected to the connection point of the capacitor 9 of the snubber circuit 70 and diode 8. For this reason, when he discharge lamp 13 is starting, the charging voltage Vb of the capacitor 17 is the sum of the voltage Vf of the snubber circuit 70 and the voltage generated by the third winding 33. Here, when the ratio of the number of turns of the first winding 33 to the number of turns of the second winding 32 is 1:1, the voltage Vf is the sum of the voltage Vg of the positive side power supply input terminal 1 and the charging voltage Va of the smoothing capacitor 12. Accordingly, in the same way as the second, third and fourth embodiments, the fifth embodiment can reduce the number of turns of the third winding 33 and thereby improve the efficiency of the transformer 30.

On the other hand, when the semiconductor switching element 5 is in the ON state, the voltage Vh of the anode side of the rectifier diode 15 is the difference between the voltage generated at the third winding 33 by the current flowing in the first winding 31 and the voltage Vf of the snubber circuit

70. In contrast to this, when an end of the third winding 33 is grounded as in the above-described first embodiment, the voltage Vh of the anode side of the rectifier diode 15 is the difference between the voltage generated at the third winding 33 and the grounding voltage. Therefore, according to the fifth embodiment, the voltage Vh of the anode side of the rectifier diode 15 is higher than in the first embodiment. This means that together with the possibility of reducing the number of turns of the third winding 33 of the fifth embodiment as described above, the voltage Vh of the anode side of the rectifier diode 15 may be even higher. Therefore, according to the fifth embodiment, the maximum value of the reverse voltage applied to the rectifier diode 15 is smaller in comparison with the above-described first through fourth embodiments. As a result, a rectifier diode 15 having a comparatively smaller back voltage may be used to reduce costs.

A charging control circuit 60 for controlling charge into the capacitor 17 according to the charging voltage Va of the smoothing capacitor 12 is connected between the positive terminal side of the rectifier capacitor 12 and the negative terminal side of the capacitor 17. The charging control circuit 60 includes voltage divider resistances 66 and 67 dividing the charging voltage Va of the smoothing capacitor 12 (i.e., the voltage applied to the discharge lamp 13), a comparator 64 for comparing the divided voltage Va" divided by these voltage division resistances 66 and 67 with a reference voltage 65, and a transistor switching responsive to the output of the comparator 64. Here, the reference voltage 65 is set based on the level of voltage to be applied to the discharge lamp 13 (e.g., on the order of 300 V) when the discharge lamp 13 is starting before lighting.

The operation of the charging control circuit 60 will now be described.

When the discharge lamp 13 is starting, since the divided voltage Va" is greater than or equal to the reference voltage 65, the output of the comparator 64 is at a high level, and the transistor 62 is maintained in the ON state. Accordingly, a charging circuit of the capacitor 17 starting from the capacitor 17 to ground through the resistance 16 and the collector/emitter of the transistor 62 is formed, and the capacitor 17 is charged.

When the charging voltage Vb of the capacitor 17 reaches the discharging voltage Ve of the discharge tube 19 and the discharge lamp 13 lights up at the n-th high-voltage pulse generated by the discharge of the discharge tube 19, the charging voltage Va of the smoothing capacitor 12 lowers, the output of the comparator 64 falls to a low level, and the transistor 62 switches OFF. Therefore, the charging circuit of the capacitor 17 is shut off, and the charging voltage Vb of the capacitor 17 is controlled to a low value. Specifically, when the maximum voltage of an end of the third winding 33 is $V_M$ and the withstand voltage of the collector-emitter junction of the transistor 62 is $V_N$, the charging voltage Vb of the capacitor 17 is the difference between Vm and Vn (Vb=Vm−Vn). Since this charging voltage Vb can be set to a substantially smaller value compared to the discharging voltage Ve of the discharge tube 19, even if the discharging voltage Ve falls due to the degradation of the discharge tube 19, the generation of high-voltage pulses during the period when the discharge lamp 13 is lighting can be prevented.

It should be noted here that a capacitor 61 connected in parallel to the transistor 62 has a larger electrostatic capacity than the parasitic capacity of the transistor 62. This capacitor 61 is designed to prevent undesired switching of the transistor 62 by smoothing the collector current of the transistor 62. Furthermore, a protective Zener diode is connected to the transistor 62 between the base collectors.

Although the present invention has been fully described in connection with the preferred embodiments thereof with reference to the accompanying drawings, it is to be noted that various changes and modifications will become apparent to those skilled in the art. For example, the present invention is not limited to the above embodiments, but may also be used as, for example, an automotive headlight system using a vehicle-mounted power source. Such changes and modifications are to be understood as being included within the scope of the present invention as defined by the appended claims.

What is claimed is:

1. A lighting system for a high-voltage discharge lamp for supplying lighting power and starting power to said discharge lamp, said system comprising:

a transformer including a first winding as a primary winding, a second winding as a secondary winding and a third winding as an additional secondary winding;

a control circuit, including a semiconductor switching element for intermittently applying a primary current to said primary winding, for regulating output power to said secondary side of said transformer by controlling said semiconductor switching element;

a supply circuit for supplying said lighting power from said second winding to said discharge lamp; and a start circuit for generating high-voltage starting pulses by receiving power from said third winding and supplying said high-voltage starting pulses to said discharge lamp;

wherein a low-voltage side end part of said third winding is connected to a high-voltage side end part of said second winding, and a high-voltage side end part of said third winding is capable of supplying .power to said start circuit.

2. The system of claim 1, said control circuit comprising:

a feedback control circuit for outputting control signals to regulate said supply power to said discharge lamp at a specified power level;

a drive circuit for periodically and intermittently driving said semiconductor switching element responsive to said control signals; and a circuit for outputting control signals that maximize said output power to said secondary side of said transformer when said discharge lamp is starting.

3. The system of claim 2, further comprising a start control circuit for activating said start circuit only when said discharge lamp is starting.

4. The system of claim 1, further comprising a start control circuit for detecting said start time of said discharge lamp and activating said start circuit only when said discharge lamp is starting.

5. The system of claim 1, wherein:

a low-voltage end of said second winding is connected to said ground side end of said first winding.

6. The system of claim 1, wherein:

a snubber circuit is provided as said primary side of said transformer in parallel with said first winding;

said snubber circuit includes a diode, a capacitor connected in series with said diode, and a resistance connected in parallel with said capacitor, and said diode is connected using said ground side of said first winding as an anode; and said low-voltage end of said third winding is connected to a cathode side of said diode, and said high-voltage side end part of said third winding is capable of supplying power to said start circuit.

7. The system of claim 1, wherein said start circuit comprises:
- a capacitor for being charged by power from said third winding;
- a discharge tube for discharging when said charging voltage of said capacitor at least reaches a specified voltage; and
- a high-voltage transformer for applying high-voltage pulses to said discharge lamp by using discharging current from said discharge tube.

8. The system of claim 1, further comprising a charging control circuit for controlling said charging voltage to said capacitor to a high voltage only when said discharge lamp is starting.

9. A lighting system for a discharge lamp for controlling said power applied to said discharge lamp, said lighting system comprising:
- power supply input terminals to which DC power is supplied and output terminals to which said discharge lamp is connected;
- a transformer including a first winding as a primary winding, a second winding as a secondary winding, and a third winding as an additional secondary winding, DC current being capable of being supplied from said power supply input terminals to said first winding;
- a control circuit, including a semiconductor switching element for intermittently supplying a primary current from said power supply input terminals to said primary winding, for regulating output power to said secondary side of said transformer by controlling said semiconductor switching element;
- a supply circuit for supplying continuous lighting power for said discharge lamp from said second winding to said output terminals, said supply circuit including a rectifier element for rectifying voltage generated to said second winding; and
- a start circuit for generating high-voltage starting pulses by receiving power from said third winding and supplying said high-voltage starting pulses to said output terminals, said start circuit including
- a capacitor capable of being charged with power from said third winding,
- a discharge tube for discharging when said charging voltage of said capacitor reaches or exceeds a specified voltage, and
- a high-voltage transformer for applying high-voltage pulses to said output terminals by using said discharging current of said discharge tube;

wherein said capacitor is connected to one of said first winding and said second winding as well as to said third winding, and is capable of being charged only by said voltage higher than said output voltage of said third winding.

10. The system of claim 9, wherein said supply circuit includes a rectifier element for rectifying voltage generated to said second winding.

11. The system of claim 10, wherein said start circuit comprises:
- a capacitor capable of being charged with power from said third winding;
- a discharge tube for discharging when said charging voltage of said capacitor reaches or exceeds a specified voltage; and
- a high-voltage transformer for applying high-voltage pulses to said output terminals by using said discharging current of said discharge tube.

12. The system of claim 11, wherein said capacitor is connected to one of said first winding and said second winding as well as to said third winding, and is capable of being charged only by said voltage higher than said output voltage of said third winding.

13. The system of claim 9, wherein said lighting system further comprises a charging control circuit for controlling said charging voltage to said capacitor at a high voltage only when said discharge lamp is starting.

14. The system of claim 9, wherein said control circuit comprises:
- a feedback control circuit for outputting control signals to regulate supply power to said discharge lamp at a specified power level;
- a drive circuit for periodically and intermittently driving said semiconductor switching element according to said control signals; and
- a circuit for detecting a start time of said discharge lamp based on said voltage of said output terminals and outputting control signals that maximize said output power to said secondary side of said transformer when said start time is detected.

* * * * *